United States Patent [19]

Esmond

[11] 4,231,878
[45] Nov. 4, 1980

[54] CAPILLARY MASS TRANSFER DEVICE

[76] Inventor: William G. Esmond, 8000 Country Club Rd., Havre de Grace, Md. 21078

[21] Appl. No.: 596,501

[22] Filed: Jul. 16, 1975

[51] Int. Cl.³ ............................................. B01D 31/00
[52] U.S. Cl. ................................... 210/321 B; 422/48
[58] Field of Search ................... 210/321, 322; 422/48

[56] References Cited

U.S. PATENT DOCUMENTS

| | | | |
|---|---|---|---|
| 3,616,926 | 11/1971 | Lichtenstein | 210/321 K |
| 3,690,465 | 9/1972 | McGinnis et al. | 210/321 R |
| 3,704,223 | 11/1972 | Dietzsch et al. | 210/321 K |
| 3,976,576 | 8/1976 | Jacobsen et al. | 210/321 B |

Primary Examiner—Charles N. Hart
Assistant Examiner—David R. Sadowski
Attorney, Agent, or Firm—Charles E. Brown

[57] ABSTRACT

This disclosure relates to a capillary mass transfer device suitable for use as an artificial kidney or an artificial lung and including a plurality of capillary tubes through which blood may flow. The capillary tubes are carried by sheet material which defines wall portions of passages in which the capillary tubes are disposed and through which a second fluid (dialysate) flows. The sheet material with the tubes arranged thereon may either be continuous and spirally wound or may be in the form of separate sheets and arranged in stacks.

12 Claims, 12 Drawing Figures

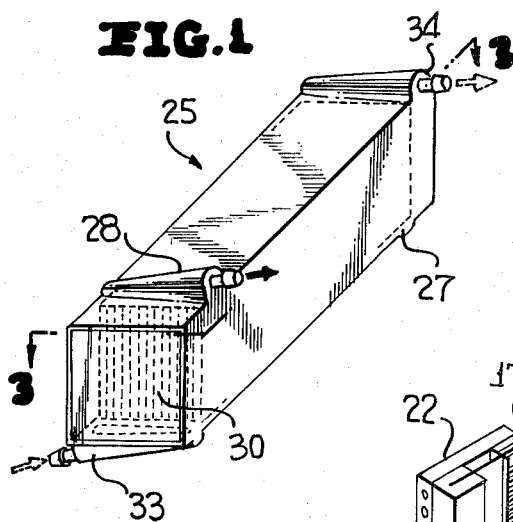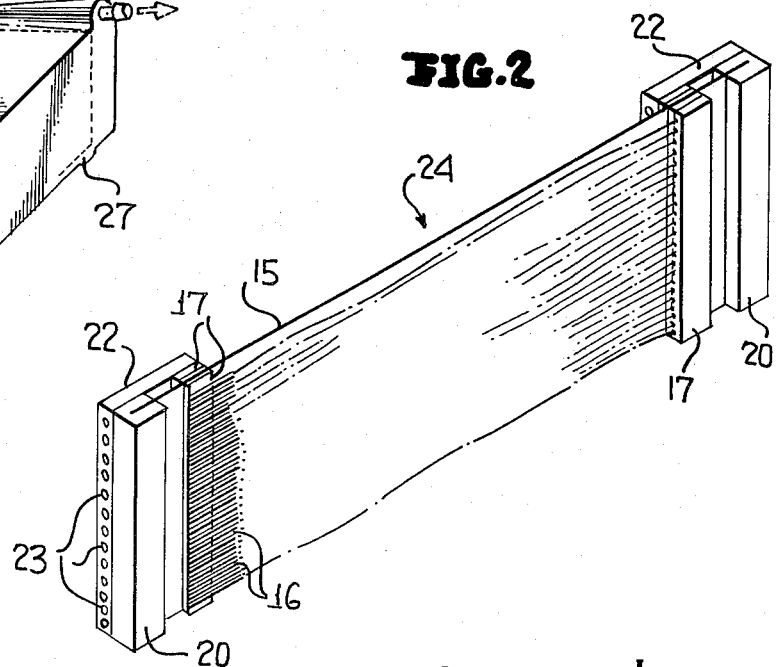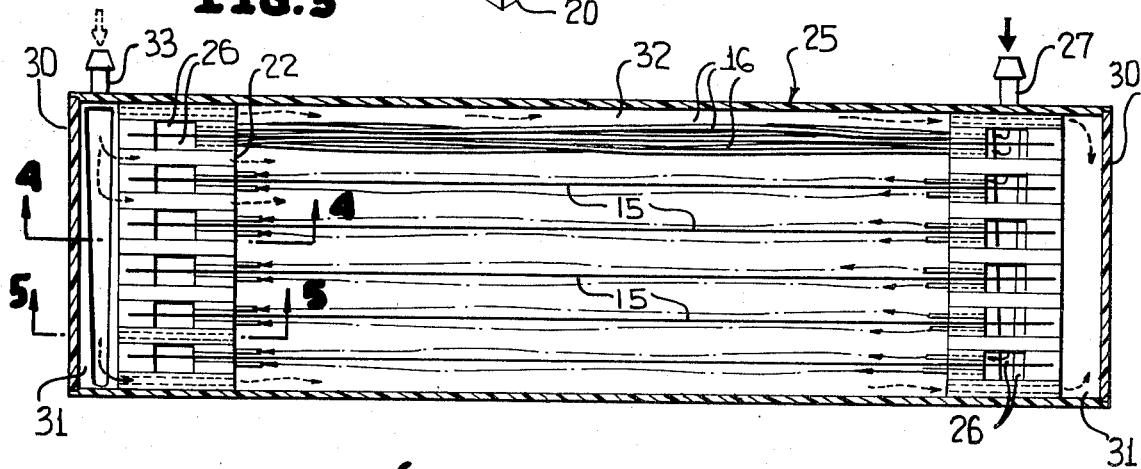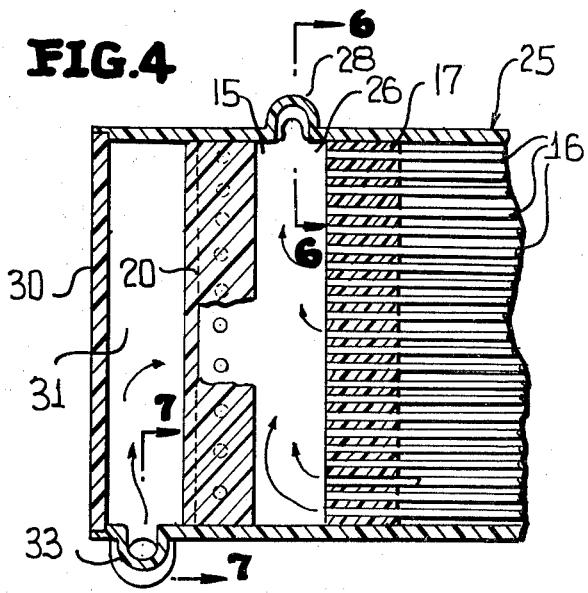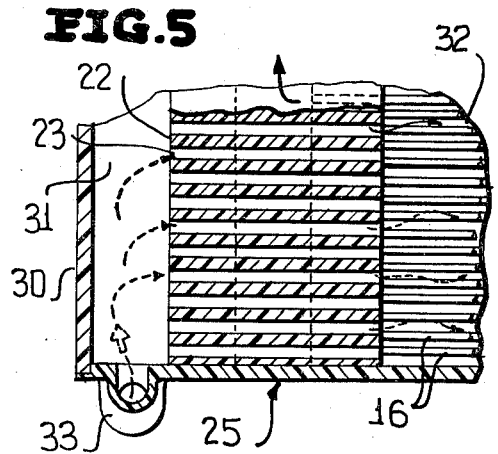

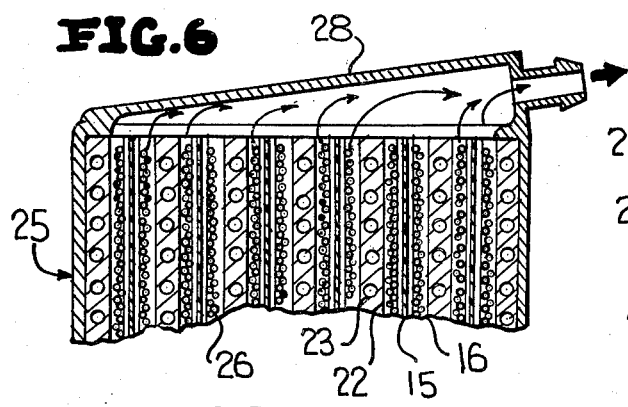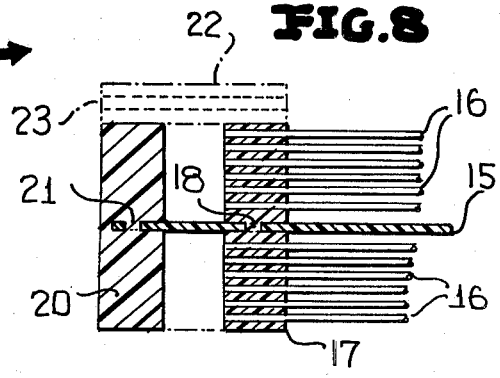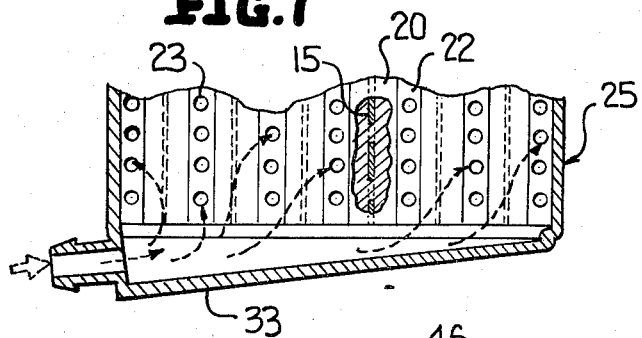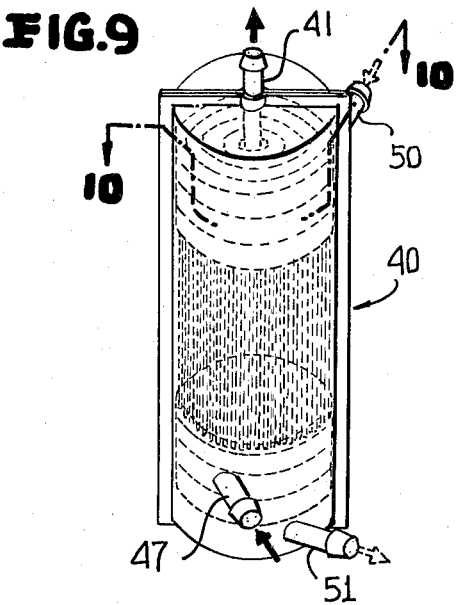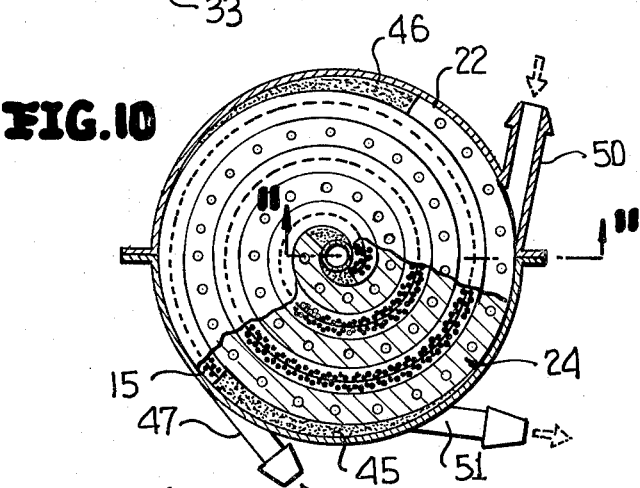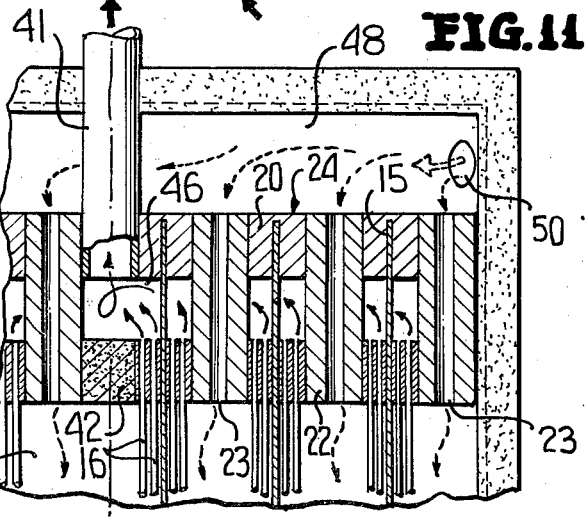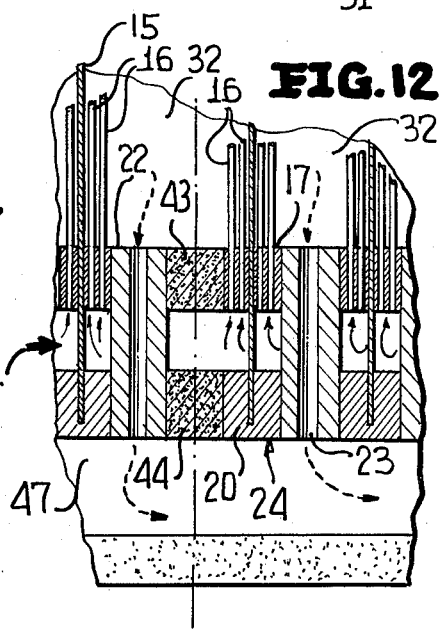

CAPILLARY MASS TRANSFER DEVICE

This invention relates in general to new and useful improvements in transfer devices, and more particularly to a capillary mass transfer device.

In the past capillary tubes or hollow fibers have been utilized in transfer devices. However, difficulties have been encountered in obtaining not only the orderly flow of blood therethrough, but also in the flowing of the necessary transfer fluid around such capillary tubes.

In accordance with this invention, it is proposed to provide sheet material, preferably in the form of very thin plastics material of a length greater than the lengths of the capillary tubes, to bond end portions of the capillary tubes in layers to at least one side of the sheet material, to provide spacers at the ends of the sheet material in accordance with the thickness of the tube layers, and then to extend between the spacers and end portions of the tubes in overlapping relation flow passage defining members which serve not only to distribute the desired transfer fluid into the space surrounding the tubes, but also defining at opposite ends of the sheet material flow passages for the flow of blood or other liquid into and out of the tubes.

The sheet material with the capillary tubes, spacers and flow passage defining members assembled thereon may either be arranged in stacks or may be continuous and spirally wound.

The foregoing assembly of sheet material, capillary tubes, spacers and flow passage defining members provides not only for the adequate supplying of blood or other fluid to the tubes and the collection thereof after it exits from the tube, but also provides for an efficient flow of the transfer fluid (dialysate) around the tubes.

With the above and other objects in view that will hereinafter appear, the nature of the invention will be more clearly understood by reference to the following detailed description, the appended claims and the several views illustrated in the accompanying drawings:

IN THE DRAWINGS:

FIG. 1 is a perspective view of a transfer device formed in accordance with this invention which includes a transfer unit of a stacked type.

FIG. 2 is an enlarged perspective view of an assembly in accordance with this invention which may either be of a predetermined width for stacking or may be continuous.

FIG. 3 is a horizontal sectional view taken along the line 3—3 of FIG. 1 and shows more specifically the details of the transfer set therein which is of a stacked relationship.

FIG. 4 is an enlarged fragmentary sectional view taken along the line 4—4 of FIG. 3 and shows specifically the flow passages for the two different fluids at one end of the device.

FIG. 5 is another fragmentary sectional view taken along the line 5—5 of FIG. 3 and shows further details of the flow passages.

FIG. 6 is an enlarged fragmentary transverse sectional view taken along the line 6—6 of FIG. 4 and shows specifically the flow through the tubes.

FIG. 7 is a fragmentary transverse sectional view taken along the line 7—7 of FIG. 4 and shows more specifically the flow of the transfer fluid through the flow passage defining members.

FIG. 8 is an enlarged fragmentary sectional view of an end portion of one of the assemblies of FIG. 2 showing plural layers of tubes.

FIG. 9 is a perspective view of still another form of transfer device in accordance with this invention having therein a spirally arranged set.

FIG. 10 is a transverse horizontal sectional view on an enlarged scale showing the arrangement of the capillary tubes, wall defining means and flow passage defining members within the housing.

FIG. 11 is an enlarged fragmentary vertical sectional view taken along the line 11—11 of FIG. 10 and shows specifically the flow of the two fluids at the upper end of the device of FIG. 9.

FIG. 12 is an enlarged fragmentary vertical sectional view taken through the lower portion of the device of FIG. 9 and shows the specific flow of fluids at that end of the device.

Reference is first made to FIGS. 2 and 8 wherein a typical assembly of components of the exchange device is illustrated. The assembly starts with a wall defining member 15 which is preferably formed of sheet material and more specifically a sheet of plastics material although metal foil could be utilized. The plastics material, when the transfer device is to be utilized in conjunction with blood, must be compatible with blood and is preferably a polycarbonate or MYLAR. The wall defining member 15 is of a greater length than the capillary tubes to be attached thereto, as is clearly shown in FIGS. 2 and 8. The capillary tubes, identified by the numeral 16, also must be compatible with blood and must have the capability of permitting very limited transfer flow therethrough. It has been found that suitable plastics materials include cellulose, cellulose acetate, polycarbonate and poly acrylonitrile. It is to be understood that the capillary tubes 16 are in the form of hollow fibers and preferably have a hole size on the order of 200 microns.

In assembling the capillary tube 16 with the wall forming member 15, a suitable layer of adhesive 17 will be applied to the sheet material forming the wall forming member 15 and the end portions of the tube 16 will be embedded therein, as shown at the left side of FIG. 2. Thereafter, further adhesive or potting material will be applied in the same area so as to build up a barrier, as shown at the right hand side of FIG. 2. While only one layer of the tube 16 has been illustrated in FIG. 2, it is to be understood that plural layers of the tube 16 may be applied to the wall forming member 15 and that the adhesive 17 will build up in a solid block. It is also to be understood that while in both FIGS. 2 and 8 the tubes 16 have been illustrated as being applied to opposite sides of the wall forming member 15, it is feasible to apply the tubes only to one side of the wall forming member. Further, in order to facilitate the anchoring of the adhesive 17 to the sheet material of the wall forming member 15, suitable apertures 18 are formed in the sheet material, as is shown in FIG. 8.

It is proposed, in accordance with this invention, to provide the opposite ends of the wall forming member 15 with a spacer 20. Each spacer 20 is preferably of an extruded construction and is formed of a suitable plastics material including polyurethane, polyesters and silicones. When the fiber bundles, that is the capillary tube 16, are applied to opposite sides of the wall forming member 15, then the spacer 20 will, of course, be formed on opposite sides of the wall forming member in a like manner, as is clearly shown in FIGS. 2 and 8. In order that the spacers 20 may be interlocked with the sheet material of the wall forming member 15, end portions of the wall forming member 15 are provided with suitable apertures 21 through which the spacer material 20 may be extruded.

After the desired layers of tube 16 have been bonded to the wall forming member 15 and the spacers 20 formed on the opposite ends thereof, at one side of the wall forming member 15 but at both ends thereof, there is provided a flow passage defining member 22 which bridges the space between the spacer 16 and the adhesive 17 and overlaps the same. The member 22 is provided with a plurality of apertures or bores 23 therethrough and is suitably resealed to the spacer 20 and the adhesive 17. The member 22 is also preferably formed of polyurethane, polyester or silicone, although other materials compatible with blood may be utilized.

The assembly shown in FIG. 2, which is generally identified by the numeral 24, is preferably formed generally on a continuous basis and is then cut to predetermined lengths. It is to be understood that the term "width" applies axially of the tube 16 and that the term "length" applies transversely of the tube 16.

In the embodiment of the device illustrated in FIGS. 1 and 3-7, there is a plurality of the assemblies 24 arranged in stacked relation so as to provide a set. This set is sealed at its ends by the bonding of the flow passage defining members 22 to the spacers 20, and the potting of the set of assemblies 24 along the edges thereof. The set is then assembled within a housing 25 in sealed relation. It is to be understood that when the set of assemblies 24 is assembled within the housing 25, with particular reference to FIG. 4, it will be seen that the wall defining members 15 together with the flow passage defining members 22 define first flow passages 26 in communication with the interiors of the tubes 16. With particular reference to FIG. 4, it will be seen that flow to the left out of the flow passage 26 is prevented by the combination of the spacers 20 and the flow defining members 22 and that flow between the capillary tube 16 to the right is prevented by the adhesive 17.

The housing 25 is provided with a first fluid inlet manifold 27 and a first fluid discharge manifold 28 which are in communication with the flow passages 26 at the opposite ends of the tubes 16. When the device 25 is an artificial kidney or an artificial lung, the first fluid will be the patient's blood.

As is also apparent from FIGS. 4 and 5, when the set of assemblies 24 terminate in spaced relation to ends 30 of the housing 25, there is formed at the opposite ends of the housing 25 flow passages 31. As is best illustrated in FIG. 5, each flow passage 31 is open to the apertures 23 of the flow passage defining members 22 whereby a second fluid may flow into and through passages 32 between the adjacent wall forming members 15 and around the capillary tubes 16.

The housing 25 includes an inlet manifold 33 for a second fluid at one end thereof and a discharge manifold 34 for the second fluid at the opposite end thereof. The manifolds 33 and 34 are in communication with the passages 31 at the opposite ends of the housing 25. It is to be understood that when the device 25 is an artificial kidney, a suitable dialysate will form the second fluid while when the device 25 is utilized as an artificial lung, the second fluid may be in the form of oxygen.

It will be readily apparent from the foregoing description and the illustrations of FIGS. 1 through 8 that a maximum number of capillary tubes may be packed within a relatively small housing while at the same time providing for efficient flow of a transfer fluid about the capillary tubes. While generally the arrangement provides for an efficient flow of the transfer fluid (second fluid) around the capillary tubes, it is to be understood that the passages 32 may also be provided with baffle means (not shown) if too great of laminar flow of the second fluid occurs within the passages 32.

Reference is now made to the embodiment of FIGS. 9 through 12 wherein the assembly 24, in lieu of being in the form of narrow units is a relatively long unit which is spirally wound and placed within a cylindrical housing generally identified by the numeral 40. The housing 40 is illustrated as being of a longitudinally split construction and includes a pair of halves which are suitably secured together. It will be readily apparent from FIGS. 10, 11 and 12 that the assembly 24 is tightly wound to have a minimum diameter bore and to substantially fill the housing 40. As is best shown in FIG. 11, at the extreme upper end of the assembly 24 the bore is closed by a centrally located discharge tube 41 which functions as a discharge manifold for the first fluid. Also, the bore at the upper end of the assembly 24, but between the end portions of the tubes 16, is closed by a plug 42.

With reference to FIG. 12, it will be seen that a further plug 43 closes the bore at the bottom between the capillary tube 16 while the bore at the extreme bottom of the assembly 24 is closed by a final plug 44. It might be said that the tube 41 and the plugs 42, 43 and 44 form a core for the assembly 24. Further, if desired, the plugs 42 and 43 may be portions of an elongated core which extend the full length of the tubes 16.

Referring now to FIG. 10, it will be seen that the outer edge of the wall defining member 15 is closed by a filling of potting material 45. In a like manner, the space left by the termination of the flow passage defining member 22 may also be closed by a suitable potting material 46.

It will be readily apparent from FIG. 12 that the spirally arranged wall forming member 15 and the flow passage defining member 22 together with the spirally arranged spacer 20 and the spirally arranged adhesive 17 and the ends of the capillary tubes 16 define a spiral flow passage 45 which opens into the lower ends of the capillary tubes 16. A like spiral flow passage is formed in the upper end portion of the set defined by the spirally wound assembly 24. A first fluid inlet manifold 47 (FIG. 10) opens into the flow passage 45 and the first fluid passes both through the spiral flow passage 45 and into and through the capillary tube 16, exiting into the spiral flow passage 46 and out through the tube 41 forming the discharge manifold for the first fluid. It will be seen that in view of the spiral arrangement of the flow passages 45 and 46, that the first fluid all travel substantially the same distance through the device.

It will be seen that the spiral wound assembly 24 is so positioned within the housing 40 so as to leave a flow passage 47 at the bottom and another flow passage 48 at the top of the housing. A second fluid inlet manifold 50 opens into the flow passage 48 and directs fluid down through the apertures or passages 23 in the flow passage defining member 22 into the spaces 32 between adjacent portions of the wall forming member 15 and around the capillary tubes 16. In a like manner, the second fluid flows down out of the spacers 32 through the apertures in the flow passage defining member 22 and into the flow passage 47 and out through a second fluid discharge manifold 51.

It will be readily apparent that the device of FIGS. 9 through 12 is also a compact device and may be even more readily formed than the device of FIGS. 1 through 8 in that a single elongated assembly 24 may be formed and then assembled by merely spirally winding the same while adhesively bonding together adjacent portions thereof, such as the free faces of the flow passage defining member 22 to the adjacent portions of the spacer 20 and the adhesive 17 bonding the capillary tube 16 to the wall forming member 15.

Although only two preferred embodiments of the capillary mass transfer device have been specifically illustrated and described herein, it is to be understood that minor variations may be made therein without departing from the spirit and scope of the invention, as defined by the appended claims.

What I claim as new:

1. A capillary mass transfer device comprising a group of capillary tubes, said group of tubes including a plurality of tubes arrranged in side by side and generally stacked relation with said tubes defining a general plane, means for defining a fluid passage surrounding said tubes, first flow means for directing a first fluid into and through said tubes, and second flow means for directing a second fluid through said first flow means into and through said fluid passage, said means defining a fluid passage including a pair of wall defining members extending generally coextensive with said tubes in the direction of tube length and lying in planes disposed generally parallel to said general plane of the tubes, said wall defining members being spaced with respect to one another transversely of said tubes and disposed on opposite sides of the general plane of said tubes with said tubes being disposed therebetween, said wall defining members further having end portions in the direction of tube length disposed beyond each end of said tubes, means fixedly securing end portions of said tubes relative to said wall defining members and in sealed relation to said wall defining members, and said second flow means including flow passage defining members positioned between said end portions of said wall defining members and extending generally parallel to the general plane of said tubes, each flow passage defining member having inner and outer end portions with each inner end portion being sealed relative to exteriors of said tube end portions and forming part of said means defining a fluid passage, said flow passage defining members having flow passages therethrough opening into said fluid passage.

2. A device according to claim 1 wherein said wall defining members are sealed relative to flow passage defining member outer end portions, said flow passage defining members being in transversely spaced relation to said tube ends and extending longitudinally beyond said tube ends in the direction of tube length, and intermediate portions of said wall defining members between said tube ends and said seals with said flow passage defining members dividing said first flow means into separate parts.

3. A device according to claim 2 wherein said wall defining members are formed of thin sheet material.

4. A device according to claim 2 wherein there are wall defining members in excess of two and between each pair of wall defining members there is one of said group of tubes, a housing surrounding said wall defining members and groups of tubes and in part defining said first flow means and said second flow means, first manifold means carried by said housing for directing a first fluid into said first flow means adjacent one end of said housing and out of said first flow means adjacent an opposite end of said housing, and second manifold means for directing a second fluid into and out of opposite ends of said housing for flow through said flow passage defining members.

5. A device according to claim 4 wherein said wall defining members and groups of tubes are in stacked relation.

6. A device according to claim 4 wherein adjacent ones of said wall defining members are integrally interconnected and formed as a single spirally arranged wall member and said groups of tubes are arranged spirally as a single continuous group.

7. A device according to claim 6 wherein first fluid flow to said tubes and from said tubes at opposite ends of said housing is spirally inwardly at one end and spirally outwardly at the opposite end.

8. A device according to claim 4, wherein each wall defining member is formed of sheet material, said tubes are arranged in layers on at least one side of each wall defining member, spacers are arranged at the ends of each wall defining member in the direction of tube length in accordance with the thickness of said tube layers, and said flow passage defining members are in the form of apertured members overlapping and positioned between said spacers and said tube ends.

9. A device according to claim 8 wherein said sheet material is perforated generally in alignment with said spacers and end portions of said tubes to facilitate adherence of said tubes and said spacers to said sheet material.

10. A device according to claim 8 wherein there is a plurality of separate ones of said wall defining members, said groups of tubes, said spacers and said flow passage defining members all arranged in stacked alternating relation.

11. A device according to claim 8 wherein said wall defining members are defined by a single length of said sheet material, said layers of tubes, said spacers and said flow passage defining members are arranged continuously on said single length of sheet material, and the thus assembled components of said devices are spirally wound.

12. A device according to claim 1 wherein said tubes are arranged in layers on at least one of said wall defining members.

* * * * *